(12) United States Patent
Stryjewski et al.

(10) Patent No.: US 10,733,442 B2
(45) Date of Patent: Aug. 4, 2020

(54) OPTICAL SURVEILLANCE SYSTEM

(71) Applicant: Vision Engineering Solutions, LLC, Merritt Island, FL (US)

(72) Inventors: John Stryjewski, Merritt Island, FL (US); Raymond Rodgers, Melbourne, FL (US)

(73) Assignee: Vision Engineering Solutions, LLC, Merritt Island, FL (US)

( * ) Notice: Subject to any disclaimer, the term of this patent is extended or adjusted under 35 U.S.C. 154(b) by 198 days.

(21) Appl. No.: 15/974,016

(22) Filed: May 8, 2018

(65) Prior Publication Data

US 2019/0065850 A1 Feb. 28, 2019

Related U.S. Application Data

(60) Provisional application No. 62/503,655, filed on May 9, 2017.

(51) Int. Cl.
| | |
|---|---|
| *G06K 9/00* | (2006.01) |
| *B64C 39/02* | (2006.01) |
| *G06K 9/62* | (2006.01) |
| *G06K 9/32* | (2006.01) |
| *G06K 9/64* | (2006.01) |
| *G06K 9/20* | (2006.01) |

(52) U.S. Cl.
CPC ........ *G06K 9/00637* (2013.01); *B64C 39/024* (2013.01); *G06K 9/0063* (2013.01); *G06K 9/00201* (2013.01); *G06K 9/209* (2013.01); *G06K 9/2018* (2013.01); *G06K 9/2054* (2013.01); *G06K 9/3233* (2013.01); *G06K 9/6202* (2013.01); *G06K 9/64* (2013.01); *B64C 2201/123* (2013.01); *B64C 2201/127* (2013.01); *G06K 9/00771* (2013.01)

(58) Field of Classification Search
CPC ........... G06K 9/00637; G06K 9/00201; G06K 9/0063; G06K 9/2018; G06K 9/2054; G06K 9/209; G06K 9/3233; G06K 9/6202; G06K 9/64; B64C 39/024
USPC ....................................................... 382/103
See application file for complete search history.

(56) References Cited

U.S. PATENT DOCUMENTS

| | | | |
|---|---|---|---|
| 6,859,275 B2 | 2/2005 | Fateley et al. | |
| 7,106,435 B2 | 9/2006 | Nelson | |
| 7,324,196 B2 | 1/2008 | Goldstein et al. | |
| 7,538,872 B1 | 5/2009 | Butler et al. | |
| 8,295,548 B2 | 10/2012 | Banerjee et al. | |
| 9,165,361 B1* | 10/2015 | Ely | G06T 3/00 |
| 2004/0236229 A1 | 11/2004 | Freeman et al. | |
| 2005/0002572 A1 | 1/2005 | Saptharishi et al. | |
| 2010/0073504 A1 | 3/2010 | Park et al. | |
| 2014/0191893 A1* | 7/2014 | Fox | G01S 13/89 342/27 |
| 2017/0054950 A1* | 2/2017 | Yeo | G01S 13/88 |
| 2017/0242234 A1* | 8/2017 | Ashcroft | G02B 21/24 |

* cited by examiner

*Primary Examiner* — Wednel Cadeau
(74) *Attorney, Agent, or Firm* — Barnes & Thornburg LLP

(57) ABSTRACT

An optical surveillance system for detecting and tracking targets of interest is configured to capture optical data of a first region of the atmosphere at a first refresh rate and to capture optical data of a second region of the atmosphere at a second refresh rate that is different than the first refresh rate.

20 Claims, 5 Drawing Sheets

OPTICAL SURVEILLANCE SYSTEM

CROSS REFERENCE TO RELATED APPLICATIONS

This application claims priority to and the benefit of U.S. Provisional Patent Application No. 62/503,655, filed 9 May 2017, the disclosure of which is now expressly incorporated herein by reference.

FIELD OF THE DISCLOSURE

The present disclosure relates generally to surveillance, detection, tracking, and characterization of man-made or natural objects and more specifically to an optical surveillance system for performing such tasks.

BACKGROUND

Some radar based surveillance and tracking systems have been used since the 1940s. Typical radar systems detect, identify and characterize objects at long range, on the ground, in the air, and in space. However, the proliferation of small Unmanned Aerial Vehicles (UAV) or Unmanned Aerial Systems (UAS) has exposed weaknesses in radar-based surveillance. With the proliferation of low-cost, small UAS, a new approach to surveillance, detection, tracking and characterization may be preferred.

SUMMARY

The present disclosure may comprise one or more of the following features and combinations thereof.

An optical surveillance system may include a sensor module and a controller. In some embodiments, the controller may include a control module and a processing module.

In some embodiments, the sensor module is a high resolution staring optical sensor (no moving parts) that views a large portion of the sky.

In some embodiments, the sensor module is programmed to collect data of varying spatial, spectral or temporal resolution, in different directions, depending on collection objectives, thus optimizing data collection bandwidth.

In some embodiments, the control module controls the sensor and the processor module processes data from the sensor. In some embodiments, the control and processing functions are in the same module. In some embodiments, some processing functions are performed by the sensor module. In some embodiments, the sensor, control, and processing functions are all co-located in the sensor module. In some embodiments, the either the control or processing functions are remote from the sensor module, i.e. the sensor is remote controlled.

In some embodiments, control or processor uses Graphical Processing Units (GPUs) to accelerate computation. In some embodiments, the sensor module has a 4 Pi steradian Field of Regard (FOR). In some embodiments, the sensor module has at least a 2 Pi steradian Field of Regard (FOR). In some embodiments, the sensor module has less than a 2 Pi steradian Field of Regard (FOR).

In some embodiments, the sensor module has a single detector. In some embodiments, the sensor module has multiple detectors.

In some embodiments, the sensor module contains one or more hyper-spectral sensors. In some embodiments, the sensor module works in optical wavebands from Ultra-Violet (UV) to Long Wave Infra-Red (LWIR).

In some embodiments, the sensor module contains one or more polarization sensors. In some embodiments, the sensor module contains one or more high-speed radiometers.

In some embodiments, all or part of the system is mounted on a pole or tripod. In some embodiments, the system is mounted on a moving module, such as a truck, aircraft, or spacecraft. In some embodiments, the system mounted under water on a fixed or moving platform.

In some embodiments, this system is used to search for objects other than UAS, such as manned vehicles and aircraft, people and animals. In some embodiments, the system is integrated into larger surveillance system, possible including radar. In some embodiments, the system is integrated into a weapon system.

In some embodiments, the system comprises multiple sensor modules. In some embodiments, the system comprises multiple processor modules. In some embodiments, the system comprises multiple control modules.

In some embodiments, the sensor module uses a laser. In some embodiments, the sensor module makes use of the polarization state of the laser. In some embodiments, the laser is used for laser ranging. In some embodiments, the laser is used for laser illumination. In some embodiments, the laser is used for laser range-gated imaging.

In some embodiments, the control/processor module has a Graphical User Interface (GUI). In some embodiments, the GUI has a 3D Situational Awareness (SA) display. In some embodiments, the GUI has an Augmented Reality (AR) display. In some embodiments, the GUI has a Virtual Reality (VR) display.

In some embodiments, the data links between the modules are either wireless or hardwired. In some embodiments, the data links between the modules are encrypted.

According to another aspect of the present disclosure, a method of using an optical surveillance system may include a) placing the sensor in surveillance mode. This mode may use reduced resolution so that all or part of the sky can be scanned at a high frame rate, b) transferring the data to the control/processor module and using spatial, spectral and temporal analysis, identify candidate targets of interest, c) programming the sensor to increase the resolution and pixel read rate only in the direction of the identified candidate target or targets, conserving data bandwidth, d) transferring this higher resolution data to the control/processor module and using spatial, spectral and temporal analysis, validate candidate targets of interest and begin tracking their location in the sky, e) programming the sensor to increase the resolution and pixel read rate only in the, updated, direction of the now validated target or targets, conserving data bandwidth, f) using a combination of spatial motion, spectral and temporal analysis to further characterize the target or targets, and g) repeating steps a) through f).

In some embodiments, the method takes a queue from an external source. In some embodiments, several systems are networked together. In some embodiments, the system gets tasking from a remote system.

In some embodiments, the tracking and characterization data is transmitted to a remote computer. In some embodiments, the tracking and characterization data is sent to another optical tracking device.

In some embodiments, the tracking and characterization data sent to a Situational Awareness Display. In some embodiments, the system performs the function of multiple physical gimbals.

In some embodiments, the system is used for satellite tracking and tracks one or more satellites simultaneously. In some embodiments, the sensor module is mounted on a moving platform, such as an aircraft, truck, or satellite.

In some embodiments, the system is used under water to monitor such things as: Unmanned Underwater Vehicles (UUVs), boats, and fish. In some embodiments, the system is used to protect secure facilities, such as: prisons, military installations, and embassies.

In some embodiments, the system is employed as part of a counter UAS system. In some embodiments, the system is employed as part of a laser weapon system.

In some embodiments, the system is employed as part of a command and control system. In some embodiments, the system is employed as part of a border security system.

These and other features of the present disclosure will become more apparent from the following description of the illustrative embodiments.

DETAILED DESCRIPTION OF THE DRAWINGS

Figure 1:
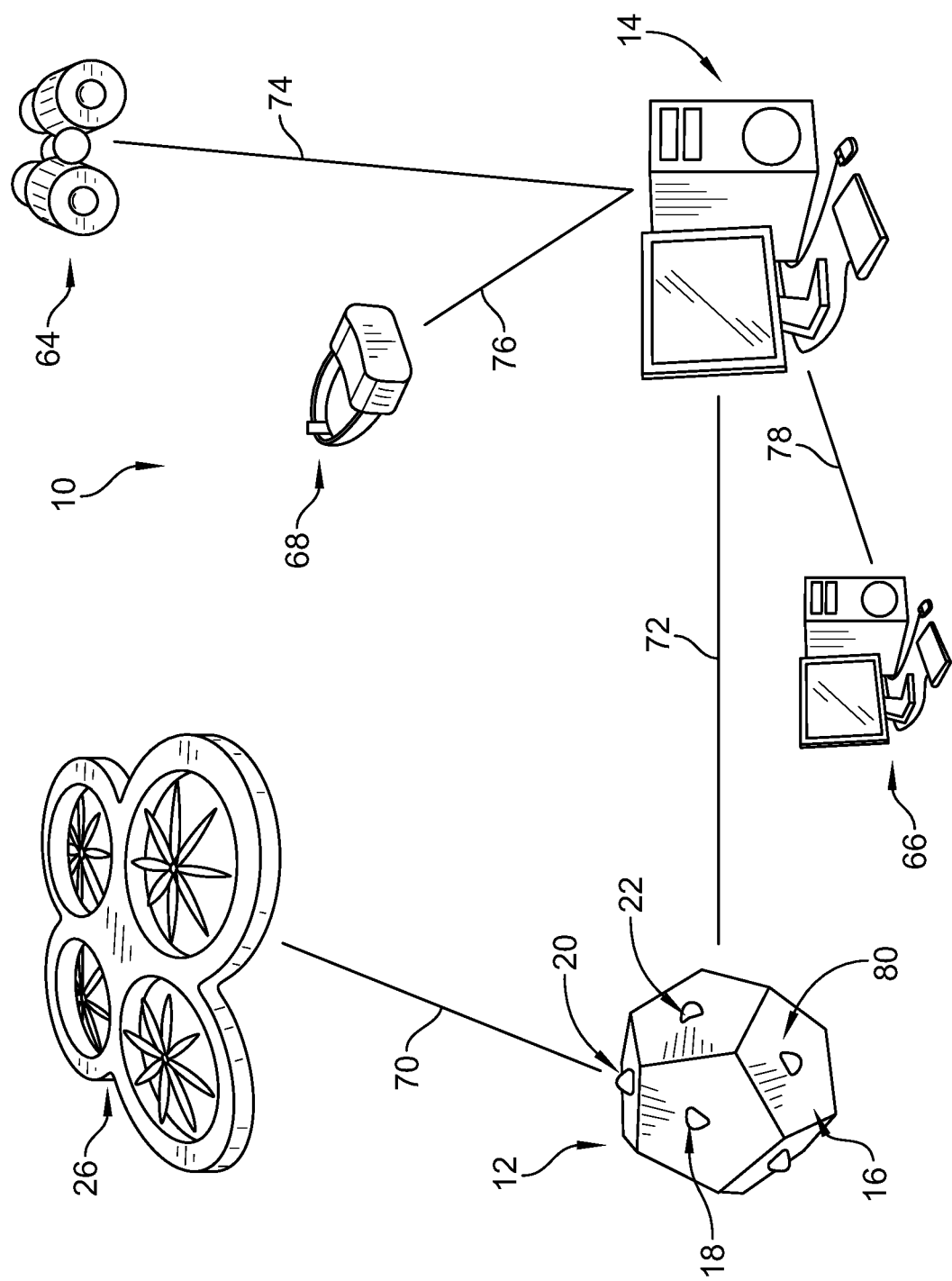
FIG. 1 is a diagrammatic depiction of an illustrative optical surveillance system in accordance with the present disclosure.

For the purposes of promoting an understanding of the principles of the disclosure, reference will now be made to a number of illustrative embodiments illustrated in the drawings and specific language will be used to describe the same.

An optical surveillance system 10 in accordance with the present disclosure is shown in FIG. 1. In the illustrative embodiment, the optical surveillance system 10 is a software-defined optical surveillance system (S-DOSS). The optical surveillance system 10 is configured to monitor an airspace and detect, track, and characterize unmanned aerial systems (UAS) in that space. In some embodiments, the illustrative system 10 collects data on the UAS trajectory, type, behavior and number. In some embodiments, this data is used as part of a 2D or 3D Situational Awareness (SA) display or system. In some embodiments, it queues other sensors, which may be at other locations, to observe or interdict the UAS.

Figure 5:
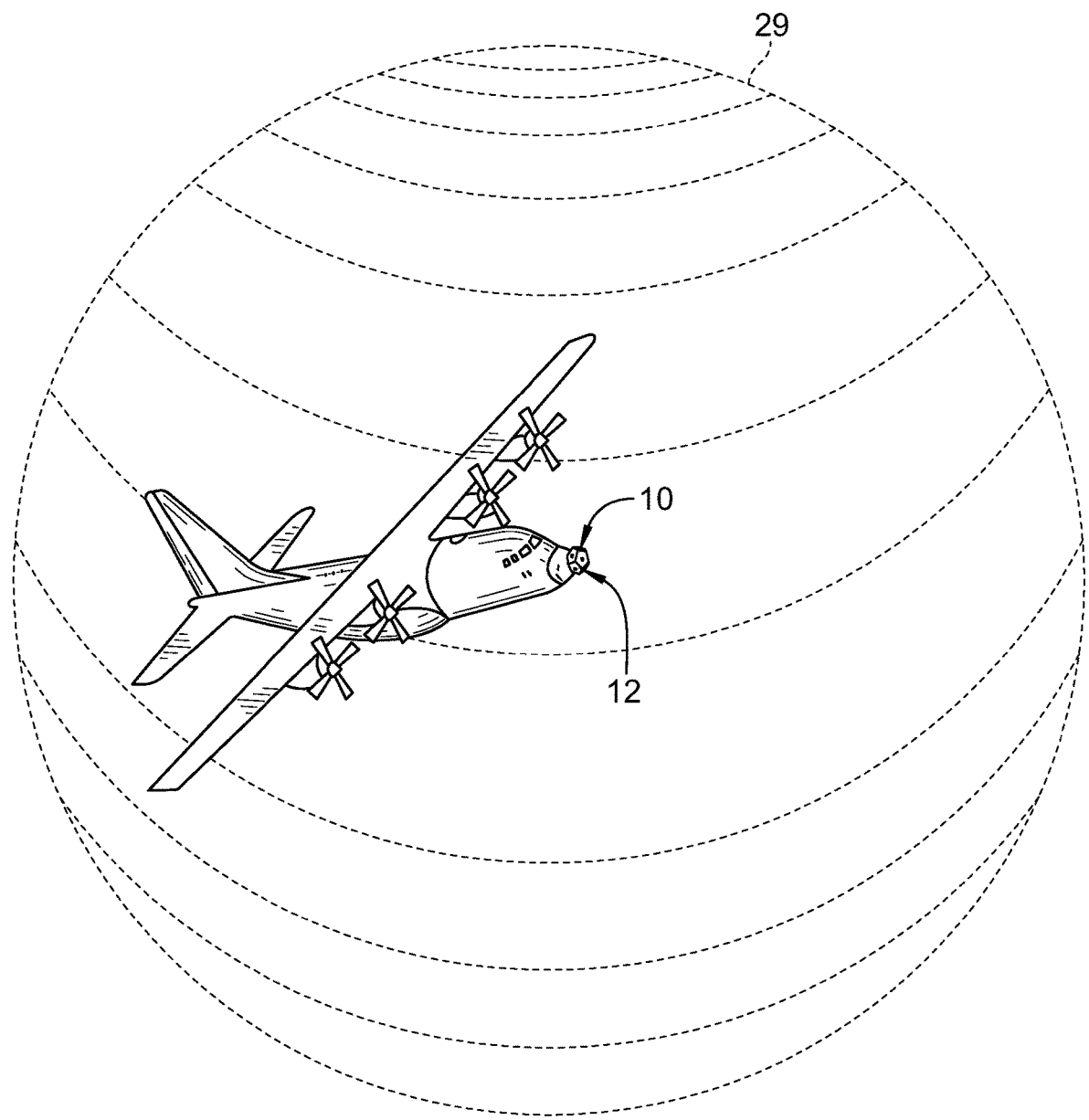
FIG. 5 is a diagrammatic depiction of the optical surveillance system of FIG. 1 mounted on a boom that projects from an aircraft to minimize obscuration caused by the aircraft and suggesting that the system is configured to capture optical data in a 4 Pi steradian field of regard.

In some embodiments, the system 10 is queued from a Common Air Picture (CAP). In some embodiments, the system 10 provides data to the CAP. In some embodiments, the system 10 is integrated into a weapons system to augment or replace radar surveillance. In some embodiments, the system 10 is used as part of a Counter Intelligence, Surveillance and Reconnaissance (C-ISR) system. The system 10 may be used to protect prisons, compounds, or areas from illicit use of UAS. The system 10 may be use to protect crime scenes or movie sets from unwanted filming. In some embodiments, the system 10 may be mounted on a boom coupled to an aircraft as shown in FIG. 5.

Referring to FIG. 1, the illustrative system 10 includes a sensor module 12 and a computer 14 or control/processing module 14 (sometimes referred to as a controller 14) connected to the sensor module 12 via a data link 72. In some embodiments, the controller 14 includes an on-sight or off-sight server configured to provide the processing of the data captured by the sensor module 12. The sensor module 12 is a staring module configured to capture data of the sky and track targets 26 without moving relative to ground or relative to a vehicle with which the module 12 is coupled. Also, shown are optional components including a data link 78 to an external computer system 66 and a data link 74 to a device 64 and a data link 76 to a 3D situational awareness display 68. Also depicted are a UAS 26 and the line of sight 70 to that UAS 26.

In some embodiments, the sensor module 12 is a dodecahedron having a plurality of faces 80 and optics 18 on each face 80. In other embodiments, the sensor module 12 has other geometric shapes. In some embodiments, the sensor module 12 is coupled to a structure or vehicle.

The sensor module 12 includes a plurality of imaging sensors 18 as shown in FIG. 1. The imaging sensors 18 are sometimes referred to as optical sensors 18 and are configured to detect at least one of infrared, visible, and ultraviolet light. The sensors 18 are staring sensors and are configured to capture data of the sky and track targets 26 without the sensors 18 or base 16 moving relative to ground or relative to a vehicle with which the module 12 is coupled. The optical sensors 18 may be configured to captured data in a conical space.

In the depicted embodiment, each face 80 of the sensor module 12 includes at least one imaging sensor 18. Illustratively, each imaging sensor 18 has a high pixel count (resolution). In some embodiments, each imaging sensor has at least 2K resolution (about 2048×2048 or greater). In some embodiments, each imaging sensor has at least 4K resolution (about 4096×4096 or greater). In some embodiments, each imaging sensor has at least 1K resolution (about 1024×1024 or greater). In some embodiments, each imaging sensor has less than 1K resolution (about 1024×1024 or less).

Each pixel is configured to capture data at two or more refresh rates. In some embodiments, at least one optical sensor 18 captures data at a refresh rate between greater than about 0.01 Hz and 3 Hz in surveillance mode. In some embodiments, at least one optical sensor 18 captures data at a refresh rate between greater than about 0.01 Hz and 10 Hz in surveillance mode. In some embodiments, at least one optical sensor 18 captures data at a refresh rate between greater than about 0.01 Hz and 30 Hz in surveillance mode.

In some embodiments, at least one optical sensor 18 captures data at a refresh rate greater than or at about 10 Hz in track mode (each of the at least one optical sensor 18 captures data at or greater than 10 Hz). In some embodiments, at least one optical sensor 18 captures data at a refresh rate greater than or at about 30 Hz in track mode. In some embodiments, at least one optical sensor 18 captures data at a refresh rate greater than or at about 100 Hz in track mode. In some embodiments, at least one optical sensor 18 captures data at a refresh rate greater than or at about 1000 Hz in track mode. In some embodiments, at least one optical sensor 18 captures data at a refresh rate between about 1 Hz and 10 Hz in surveillance mode and between about 100 Hz and 1000 Hz in track mode.

In some embodiments, each pixel is capable of detecting at least three wavelengths at rates at about or exceeding 1000 Hz. In some embodiments, the sensor module 12 includes a single sensor 18. In other embodiments, the sensor module 12 has more than one sensor 18. In some embodiments, the imaging sensors 18 include hyper-spectral sensors. In some embodiments, the imaging sensors 18 include polarization sensors.

The controller 14 is configured to control the sensor module 12 and process the data collected by the sensor module 12 as suggested in FIG. 1. In this embodiment, the controller 14 is depicted as being physically separate from the sensor module 12. In some embodiments, the sensor module 12 and controller 14 are integrated into a single module. In some embodiments, some of the processing capability could be integrated into the sensor. In other embodiments, the control and processing functions are split into two modules.

The data link 72 between the sensor module 12 and the controller 14 may be hardwired or wireless. In some embodiments, the data link 72 includes a satellite or laser communication link. In some embodiments, the link is encrypted.

In this illustrative example, the sensor module 12 initially is in a surveillance mode scanning the entire airspace multiple times a second for any UAS 26. When in surveillance mode, the sensors 18 are running in a high resolution mode (in which a relatively large area is scanned at a relatively low refresh rate) at a slower scan rate. When a potential UAS is detected, the sensor module 12 determines the line of sight 70 to the UAS and enters track mode.

In track mode, a Region of Interest (ROI) around the line of sight is defined and, in that ROI, at least one of the sensors 18 uses its highest spectral, spatial, and temporal resolution to track the movement of the UAS. This higher resolution mode enables accurate tracking and characterization of the UAS. The higher resolution may include a higher refresh rate as compared to the surveillance mode. The higher resolution may include a higher refresh rate and a smaller frame of captured data. The other sensors 18 continue monitoring the in surveillance mode for other targets of interest or UAS while the at least one sensor is in track mode.

Surveillance mode and track mode are not mutually exclusive. While in surveillance mode, the system 10 could be actively tracking and characterizing multiple UASs using multiple ROIs. Effectively, the system 10 can function simultaneously as a low resolution, full sky surveillance system while tracking, and characterizing, multiple UASs in high-resolution. This functionality is defined in real time, by the processing module, making the staring sensor into a Software-Defined Optical Surveillance System 10 (S-DOSS).

The idea of a software defined optical sensor may solve one or more of the problems with full sky optical surveillance, namely full sky optical surveillance tracking and characterization system may require an enormous number of pixels, as much as a billion pixels (GigaPixels), or more. Additionally, for the characterization function, it may be desirable to process the pixel data at up to 1000 frames per second, for example. To collect, and process, full resolution data from such a large number of pixels may not currently be technologically possible.

In our illustrative example, the system 10 may be optimized for each mission. For example, if only part of the sky is visible, because of buildings or trees, then the system 10 could be programmed to ignore the data from those pixels, further reducing bandwidth requirements as suggested in FIG. 3. If friendly targets are known from a CAP, then those targets could be removed from the processing queue, further reducing bandwidth.

The system 10 may have little or no mechanical constraints, for example: no gimbal lock, no slew rate limits, no acceleration or torque limits, no maintenance issues from moving parts, simpler weatherization, and no wind buffeting. A single system 10 may replace multiple physical optical gimbals, since the system 10 may track multiple targets simultaneously, whereas physical gimbals may track one target at a time. Illustratively, motion stabilization for the system 10 is done digitally, as opposed to gimbaled system, which is typically mechanically stabilized.

Figure 4:
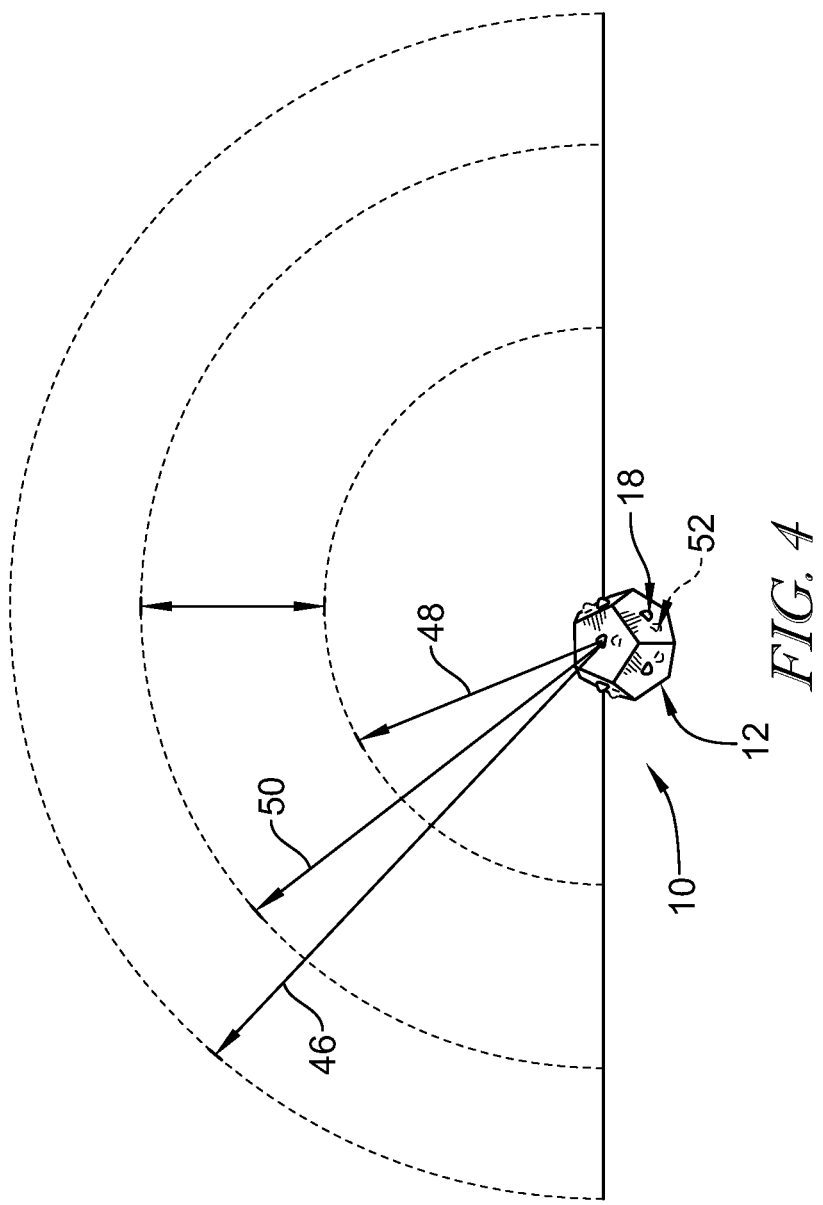
FIG. 4 is a diagrammatic depiction of the optical surveillance system of FIG. 1 showing that the system may be configured to collect only optical data between one distance from the sensor and another distance from the system that is less than a maximum capture distance of the system, for example by using range-gated imagery, thereby reducing the amount of data captured and processed by the system.

Some system embodiments include passive optical sensors 18, however, as suggested in FIG. 4, the sensors 18 could employ lasers 52 for ranging (tracking) or characterization. In some embodiments, the laser systems include no moving parts and the system may be software definable.

The embodiment in FIG. 1 depicts a data link 74 to an external optical surveillance device 64. This data could be used to project a target indicator or reticle on the device to aid in acquisition and viewing of the target, much like weapons in First Person Shooter (FPS) video games. Likewise the data link 74 could be used to take queuing information from the optical device 64 to "point" the system 10.

The embodiment in FIG. 1 depicts a data link 76 to a situational awareness display 68. This situational awareness display could be a 2D or 3D display and could use augmented reality or virtual reality as part of a user interface to the system 10. This User Interface (UI) could be either local to the control/processing module 14 or at a remote location 66 via the data link 78. The remote network link 78 could be used to provide input data to the system 10 or to output surveillance, tracking, characterization, or other data from the system 10.

Each of the data links 72, 74, 78 could be wired or wireless. In some embodiments, each of the data links 72, 74, 78 are encrypted.

Figure 2:
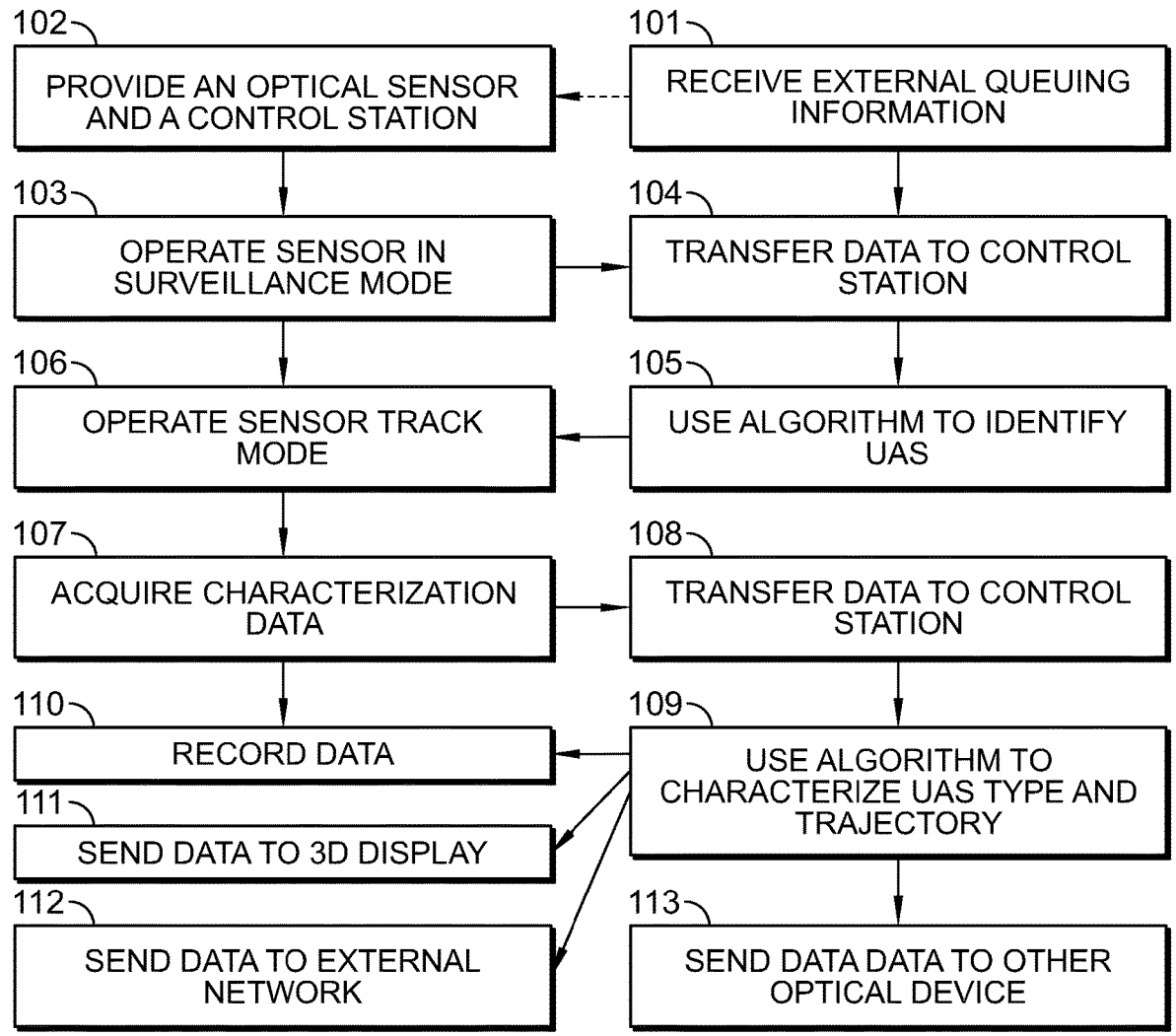
FIG. 2 is a diagrammatic depiction of a method of using the optical surveillance system of FIG. 1.

A method of using the illustrative system 10 is depicted diagrammatically in FIG. 2. Optional external data 101 may be provided to the system 10 in step 102. This data could include: queuing and target information, Identify Friend or Foe (IFF) info, situational awareness info, or command and control signals. The remaining boxes in FIG. 2 outline a method of using the illustrative embodiment described in FIG. 1.

In FIG. 2, the system 10 initially enters surveillance mode in a step 103. In this mode, low resolution data is sent, in real time, to the control/processing module in a step 104. When the data is received, it is processed to find UAS within the surveillance area in a step 105. Illustratively, this processing could involve examining the spectral and temporal information from individual pixels. If a potential UAS is found during the identify step 105, the S-DOSS system 10 is put in track mode in a step 106.

In this illustrative embodiment, while in track mode, the sensor collects high resolution, spatial, spectral, and temporal-radiometric data. This data is sent, in real time, to the control/processing module in a step 108. This data is then analyzed to identify, track and characterize UAS in a step 109. Optionally, the controller/processor module may either archive the track and characterization data in a step 110, send the data to a 3D display in a step 111, send the data to an external computer system 66 in a step 112, and/or output it to another optical tracking device in a step 113.

For most real world applications, optical turbulence may be an issue because it may limit the ability to image small objects, such as UAS. Thus, any robust optical system may be immune to atmospheric turbulence. This may be accomplished using hyperspectral, polarization and temporal-radiometric data.

Temporal-radiometric sensors measure the temporal variation in the optical radiometric signature of an object on a pixel by pixel basis. They can, for instance, detect the rotation of the blades from a UAS propeller by sensing the variation in brightness in a pixel as the orientation of the propeller changes. It may be preferred to have pixel brightness recorded at rates approaching 1000 Hz. Using a traditional system, a full sky survey may include about 1 billion 16 bit pixels (typical of full sky imagers) and target characterization may record these pixels at 1000 Hz. The data rate preferred for such a system may exceed about 2 terrabytes per second. This may be 3 orders of magnitude larger than current technology capabilities.

For optical characterization, as much information as possible may be desired. As high a pixel count as possible may be preferred for reliable full-sky optical surveillance. Taken together, these two requirements may drive us to a system design where the data rate exceeds our ability to collect and analyze. Therefore, what is preferred may be a device that optimizes the data flow, in real time, to maximize the tradeoff between surveillance and characterization bandwidth requirements.

A general-purpose Software-Defined Optical Surveillance System (S-DOSS) 10 for surveillance, detection, tracking and characterization is disclosed herein. As an illustrative example, the system 10 is configured for surveillance, detection, tracking and characterization of small type 1 and type 2 UAS. This example comprises a staring sensor module (no moving parts) with either full spherical or hemi-spherical view, and a control and data processing module. This sensor module is configured such that each element (pixel) is capable of detecting data about the UAS that is unaffected by atmospheric turbulence. For this illustrative embodiment, the sensor detects temporal-radiometric signature of the UAS in 3 wavebands.

The sensor module 12 is configured to compare color, polarization, LIDAR information, and pixel variation over time. For example, a regular or periodic difference in one of the compared metrics can indicate that the difference is manmade rather than naturally occurring. In some embodiments, the regular or periodic difference may be included in a random or natural signature and the controller is configured to detect the regular or periodic differences included in the random or natural signature.

The sensor module is controlled by a computer, which in this illustrative embodiment also processes the data collected by the sensor to detect, track, and characterize the UAS. In illustrative embodiments, the system contains enough pixels to cover the whole sky with sufficient resolution to detect the target of interest, in this case small UAS at ranges in excess of 1 km. This sensor is able to operate in a surveillance mode where the whole sky is captured and processed many times per second. An algorithm then processes the data looking for possible UAS targets. If candidates are found, the sensor transitions to a track mode where a small region of interest around the potential UAS is sensed at maximum temporal, spectral, and spatial resolution. Algorithms then apply to identify the target as a UAS.

Illustratively, the identification algorithms make use of the spectral, spatial, and temporal signature of the UAS. For example, if the UAS is resolved (spanning many pixels), then image recognition algorithms could be employed. The UAS may not be unresolved. This means that spectral and temporal algorithms may be useful. In illustrative embodiments, each pixel is capable of collecting radiometric data in multiple spectral wavebands bands; each with a temporal resolution of 1000 Hz in track mode. Discrimination algorithms use this spectral-temporal-radiometric data to identify potential UAS targets.

Once candidate targets are identified, they are tracked over time by moving the high resolution ROI of the sensor to follow them. Thus, the staring sensor acts like a tracking gimbal, i.e. a software defined telescope. The high-resolution data from the tracking is then used to further validate the candidate as a UAS. This track data can then be logged for later analysis or transferred to an external system action.

Further characterization (type, make) of the UAS can also be accomplished using the high-resolution spectral-temporal-radiometric data. When using this type of data for UAS characterization, temporal and spectral data may be virtually unaffected by atmospheric turbulence. This may be important because most optical systems used for long range viewing are adversely affected by atmospheric turbulence.

Once the UAS is characterized, information on its trajectory and characteristics can be transferred to an external location, such as: fire control computer, a hand held electronic imager for further investigation, or a 3D virtual reality display for situational awareness.

In some embodiments, the system includes sensors that work in optical wavebands from Ultra-Violet (UV) to Long Wave Infra-Red (LWIR). In some embodiments, the system uses the polarization state of the light emitted or reflected by objects.

In some embodiments, the system includes a laser illuminator or laser ranger for use during the tracking and characterization of specific targets. In some embodiments, the system includes multiple illumination and ranging lasers into the device in a manner that preserves the staring aspect (no moving parts) of the sensor.

In some embodiments, the system may be used by mounting the sensor on a pole or tripod. In some embodiments, the system may be used on a moving module, such as a truck, watercraft, aircraft, or spacecraft.

In some embodiments, the system is used under water on a fixed or moving module to watch for Unmanned Underwater Vehicles (UUV). In some embodiments, the system is used to search for objects other than UAS, such as manned vehicles, aircraft, people or animals.

In some embodiments, the system is integrated into larger surveillance system, including radar. In some embodiments, the system is integrated into a weapon system. In some embodiments, the system includes a Graphical User Interface (GUI)

In some embodiments, the system includes an integrated 2D or 3D Situational Awareness (SA) display. This SA may incorporate terrain height and other a-priori data.

In some embodiments, a Software Defined Optical Surveillance System (S-DOSS) includes a sensor module, a control module, and a processing module. The sensor module is a high resolution staring optical sensor (no moving parts) that views a large portion of the sky. It is programmed to collect data of varying spatial, spectral or temporal resolution, in different directions, depending on collection objectives, thus optimizing data collection bandwidth. The control module controls the sensor and the processor module processes data from the sensor.

In some embodiments, the control and processing functions are in the same module. In some embodiments, some processing functions are performed by the sensor module In some embodiments, the sensor, control and processing functions are all co-located in the sensor module. In some embodiments, either the control or processing functions are remote from the sensor module, i.e. the sensor is remote controlled.

In some embodiments, the control or processor use Graphical Processing Units (GPUs) to accelerate computation. In some embodiments, the sensor module has a 4 Pi steradian Field of Regard (FOR).

In some embodiments, the sensor module has at least a 2 Pi steradian Field of Regard (FOR). In some embodiments, the sensor module has less than a 2 Pi steradian Field of Regard (FOR).

In some embodiments, the sensor module has a single detector. In some embodiments, the sensor module has multiple detectors.

In some embodiments, the sensor module contains one or more hyper-spectral sensors.

In some embodiments, the sensor module works in optical wavebands from Ultra-Violet (UV) to Long Wave Infra-Red (LWIR).

In some embodiments, the sensor module contains one or more polarization sensors. In some embodiments, the sensor module contains one or more high-speed radiometers.

In some embodiments, all or part of the system is mounted on a pole or tripod

In some embodiments, the system is mounted on a moving module, such as a truck, aircraft, or spacecraft.

In some embodiments, the system is mounted under water on a fixed or moving platform. In some embodiments, this system is used to search for objects other than UAS, such as manned vehicles and aircraft, people and animals.

In some embodiments, the system is integrated into larger surveillance system, possible including radar. In some embodiments, the system is integrated into a weapon system.

In some embodiments, the system comprises multiple sensor modules. In some embodiments, the system comprises multiple processor modules.

In some embodiments, the system comprises multiple control modules. In some embodiments, the sensor module uses a laser.

In some embodiments, the sensor module makes use of the polarization state of the laser. In some embodiments, the laser is used for laser ranging. In some embodiments, the laser is used for laser illumination.

In some embodiments, the control/processor module has a Graphical User Interface (GUI). In some embodiments, the GUI has a 3D Situational Awareness (SA) display.

In some embodiments, the GUI has an Augmented Reality (AR) display. In some embodiments, the GUI has a Virtual Reality (VR) display.

In some embodiments, the data links between the modules are either wireless or hardwired. In some embodiments, the data links between the modules are encrypted According to an aspect of the present disclosure, a method of using the Software Defined Optical Surveillance System (S-DOSS) includes a number of steps. In some embodiments, the steps include placing the sensor in surveillance mode. This mode uses reduced resolution so that all or part of the sky can be scanned at a high frame rate. In some embodiments, the steps include transferring the data to the control/processor module and using spatial, spectral and temporal analysis, identify candidate targets of interest.

In some embodiments, the steps include programming the sensor to increase the resolution and pixel read rate only in the direction of the identified candidate target or targets, conserving data bandwidth. In some embodiments, the steps include transferring this higher resolution data to the control/processor module and using spatial, spectral and temporal analysis, validate candidate targets of interest and begin tracking their location in the sky.

In some embodiments, the steps include programming the sensor to increase the resolution and pixel read rate only in the, updated, direction of the now validated target or targets, conserving data bandwidth. In some embodiments, the steps include using a combination of spatial motion, spectral and temporal analysis to further characterize the target or targets.

In some embodiments, the method takes a queue from an external source. In some embodiments, several S-DOSS systems are networked together.

In some embodiments, the system gets tasking from a remote system. In some embodiments, the tracking and characterization data is transmitted to a remote computer.

In some embodiments, the tracking and characterization data is sent to another optical tracking device. In some embodiments, the tracking and characterization data sent to a Situational Awareness Display In some embodiments, the system performs the function of multiple physical gimbals. In some embodiments, the system is used for satellite tracking and tracks one or more satellites simultaneously.

In some embodiments, the sensor module is mounted on a moving platform, such as an aircraft, truck, or satellite. In some embodiments, the system is used under water to monitor such things as: Unmanned Underwater Vehicles (UUVs), boats, and fish.

In some embodiments, the system is used to protect secure facilities, such as: prisons, military installations, and embassies. In some embodiments, the system is employed as part of a counter UAS system.

In some embodiments, the system is employed as part of a laser weapon system. In some embodiments, is employed as part of a command and control system. In some embodiments, is employed as part of a border security system.

At least several factors may make UAS difficult to track with radars. First, UAS may be relatively small and their small size may mean that UAS radar cross sections are small. Therefore, UAS may be hard for a radar system to detect. Second, the motion of UAS, such as quadcopters, for example, may be similar to birds (which also have similar radar cross sections), which may make them difficult to identify and track. Furthermore, even when radars are able to detect and track UAS, they may have little or no capability to characterize them because of the small size of the UAS relative to the wavelength of surveillance radar. There may be little information available in a radar signature to discriminate between different makes or models of UAS. The present disclosure provides surveillance systems adapted to address at least some of these difficulties.

The system 10 is configured to operate in different sensor modalities. The system 10 may operate in passive and active modalities. In the passive modality, only used ambient light. In an active modality, the system 10 uses a laser, laser diode, or other light source for illumination of the scene.

In passive modality (no predefined wavelength), a plurality of characteristics may be analyzed alone or in any combination. In one example, grayscale (Intensity only) is used and only the intensity per pixel is recorded. In another example, a multispectral (2 or more colors or spectral bands) mode is used and the intensity at two or more wavelengths is used. This may be called Hyperspectral if more than 100 colors are used. In another example, polarization is used and the system directly senses the polarization of the received light. Generally only manmade objects have non-zero polarization states. In an example, temporal-radiometrics is used. High-speed (in one example, more than 100 Hz) sensing of intensity allows the use of detection algorithms that look for periodic signals. In general, only man-made objects have periodic intensity fluctuations; turbulence induced fluctuations are random.

In active modality (laser or laser diode illumination) other characteristics may be analyzed (with or without any combination of passive modality characteristics). In one example, laser range gated imagery is used. In this sensing mode, a pulsed laser is use to illuminate a scene. The sensor "shutter" is timed to only allow light from a specific range to reach the sensor. This is done by timing the shutter to open at a specific time after the pulses is launched. The shutters in this mode are only open for a specific duration so that only objects in a specific "range-gate" (or at a specific range) are sensed. In another example, a flashlight mode is used to illuminate a scene. (For example, to enable or enhance nighttime imaging.) In another example, 3D sensing (Lidar) is used. In this mode each pixel is capable of detecting the delay between when a laser pulse is emitted and when the reflected light is detected. Thus, this sensor can give a range to objects in the scene on a pixel by pixel basis.

The system 10 may be operated in surveillance mode until a potential UAS is detected. Then the system 10 goes into track mode. While in track mode only a portion of the camera (one or more sensor 18) Field of View (FOV) is used. This reduced FOV is generally termed the Field of Regard (FOR). In track mode, the FOR follows the target 26 as it move across the individual camera FOV. If the FOR reaches the edge of the camera 18, a neighboring camera 18 will be placed in track mode, to continue the track. Tracking might terminate if the target 26 is deemed uninteresting. In that case the system 10 would revert to surveillance mode. In some embodiments, the system 10 automatically enters track mode due to receiving queuing data with target information.

While in track mode, at least one sensor 18 operates with a frame rate higher than when the at least one sensor 18 is in surveillance mode. This allows more temporal data to be collected for target classification and identification while minimizing and conserving processing power.

While in track mode the controller 14 can periodically switch to viewing a sensor 18 data in surveillance mode for a short time to detect additional potential targets, and then continue with track mode. If multiple targets are detected, all may be tracked: each with its own FOR. Thus, in track mode the system 10 could be simultaneously tracking multiple objects 26. These target tracks could be handed off to other systems for interdiction.

In some embodiments, the system 10 contains a situational awareness display as part of a User Interface (UI). This display could be text based, or graphical. It could also include a 2D or 3D augmented reality display.

While the sensor module 12 is operating normally, external data can cause the system 10 to examine a specific direction with a new FOR (unless one is already there). This external queuing could be from: a human using a UI, radar, another system 10, a computer which generates a scan mode where a FOR is scanned over a region of the sky using a specified pattern (this could be from the S-DOSS computer or another computer), an acoustic sensor, a RF direction finder, and active sensing.

A method in accordance with the present disclosure may comprise a number of steps. The method may include providing the optical surveillance system 10 that includes the controller 14 and the first sensor module 12. The first sensor module 12 includes the base 16, the first optical sensor 20 coupled with the base 16, and the second optical sensor 22 coupled with the base 16. The method further includes capturing optical data of a first region of interest 30 in the atmosphere at a first refresh rate with the first optical sensor 20. The method includes capturing optical data of a second region of interest 32 in the atmosphere at a second refresh rate with the second optical sensor 22. Capturing the optical data of the second region of interest 32 at the second refresh rate with the second optical sensor 22 occurs simultaneously with capturing the optical data of the first region of interest 30 at the first refresh rate with the first optical sensor 20 in the illustrative embodiment.

In illustrative embodiments, the method includes detecting a first target of interest 26 (moving object, object of a predetermined size) located in the first region of interest 30 with the controller 14 based on the optical data of the first region of interest 30. The target of interest 26 may be detected by the system 10 detecting a predetermined signature associated with a target of interest. For example, the signature could include movement, color, heat, or any other suitable feature that sets apart the target 26 from the background.

Figure 3:
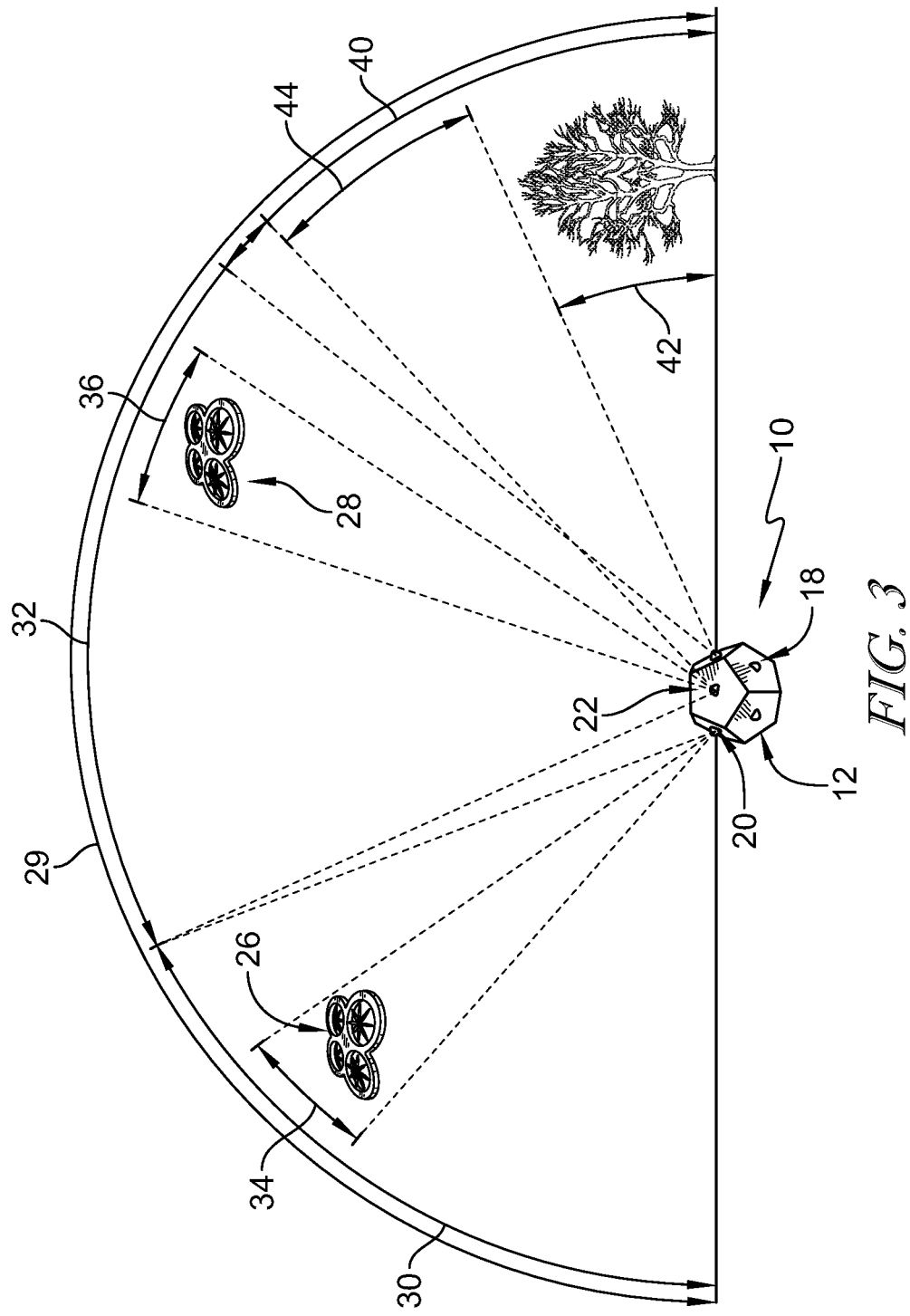
FIG. 3 is diagrammatic depiction of the optical surveillance system of FIG. 1 showing that the system is configured to capture optical data in a plurality of regions of the atmosphere at a first refresh rate and suggesting that the system is configured to capture optical data at a second and faster refresh rate in sub-regions of the plurality of regions of the atmosphere.

In illustrative embodiments, the method includes capturing optical data of a third region of interest 34 in the atmosphere at a third refresh rate with the first optical sensor 20 after detecting the first target of interest 26 while simultaneously capturing the second optical data of the second region of interest 32 at the second refresh rate with the second optical sensor 22 as suggested in FIG. 3. The third region of interest 34 is smaller than the first region of interest 30 as shown in FIG. 3. For example, the third region of interest 34 may have a smaller angle, depth, or both angle and depth as compared to the first region of interest 30. The third region of interest 34 is located inside the first region of interest 30. The third refresh rate is greater than the first refresh rate. For example, the third refresh rate may be about 100 Hz and the first refresh rate may be about 3 Hz. At least a portion of the first target of interest 26 is located in the third region of interest 34.

In illustrative embodiments, the sensors 18, including the first and second optical sensors 20, 22 are starring. The first optical sensor 20 is fixed to the base 16 such that the first optical sensor 20 is configured to capture optical data only in a fixed direction relative to the base 16. The second optical sensor 22 is fixed to the base 16 such that the second optical sensor 22 is configured to capture data only in a fixed direction relative to the base.

In illustrative embodiments, the method further comprises determining a probabilistic identity of the first target of interest 26 with the controller 14 based on the optical data of the third region of interest 34. For example, the controller 14 may determine that the target 26 shares 80 percent characteristics with an unmanned aerial vehicle as its probabilistic identity. Determining the probabilistic identity of the first target of interest 26 based on the optical data of the third region of interest 34 may include determining a probability that the first target of interest 26 is an unmanned aerial system. The system 10 may determine the probability that the target of interest 26 is an unmanned aerial system, a bird, a human, a satellite, weather balloon, and/or manned aerial system.

In some embodiments, determining the probabilistic identity of the first target of interest 26 based on the optical data of the third region of interest 34 includes comparing variations between pixels of sequential frames included in the optical data of the third region of interest 34 to predetermined data indicative of variations between pixels in sequential frames of known objects. For example, pixel variation (color/brightness) over time, polarization, temporal-radiometric, and LIDAR range data could be used to determine the probabilistic identity of the target 26. In one example, rotating blades on a UAS cause the pixels to change brightness, color, polarization, etc. over time and that pattern of change is compared to known patterns to identify the target of interest 26 as the UAS or other known object. In another example, the movement and/or size of the target of interest is compared to that of known objects and is positively identified as a UAS or is indicated as not being one or more of a number of known objects. The predetermined data may be stored in one or more lookup table.

In some embodiments, the method includes capturing optical data of a fourth region of interest 36 in the atmosphere at a fourth refresh rate with the second optical sensor 22 in response to the first target of interest 26 moving toward or into a visual field of the second optical sensor 22. The fourth region of interest 36 is smaller than the second region of interest 32. The fourth region of interest 36 is located inside the second region of interest 32 and the fourth refresh rate is greater than the second refresh rate. In some embodiments, this is performed by developing an azimuth-elevation trajectory of the target 26 using the optical data of the first and/or third regions of interest 30, 34 and predicting where the second optical sensor 22 should apply the fourth region of interest 36 to acquire the target 26. In some embodiments, the second optical sensor 22 uses the second region of interest 32 in response to the target 26 moving toward or into the visual field of the second optical sensor 22. The method may include capturing the optical data of the first region of interest 30 at the first refresh rate with the first optical sensor 20 while simultaneously capturing the optical data of the fourth region of interest 36 at the fourth refresh rate with the second optical sensor 22.

In illustrative embodiments, the method includes detecting a second target of interest 28 located in the second region of interest 32 with the controller 14 based on the optical data of the second region of interest 32 and capturing optical data of a fourth region of interest 36 at a fourth refresh rate with the second optical sensor 22 after detecting the second target of interest 28. In some embodiments, this is performed while simultaneously capturing the optical data of the third region of interest 34 at the third refresh rate with the first optical sensor 20.

In the illustrative embodiment, a pixel instantaneous field of view of the optical data of the first region of interest 30 is equal to a pixel instantaneous field of view of the optical data of the third region of interest 34. The pixel instantaneous field of view corresponds to the two dimensional (H×V) angular area that is viewed by a single pixel of the optical sensors 18. As such, the optical data of the third region of interest 34 has the same density as the optical data of the first region of interest 30. The third region of interest 34 is just smaller in size as compared to the first region of interest 30, similar to cropping a photo. As a result, each captured frame of the optical data of the third region of interest 34 includes less data as compared to each captured frame of the optical data of the first region of interest 30. In illustrative embodiments, the pixel instantaneous field of view of the optical data of the first region of interest 30 is equal to a pixel instantaneous field of view of the optical data of the second region of interest 32.

In illustrative embodiments, the system 10 is configured to receive input with the controller 14 from an external source and the method may include determining a location of the third region of interest 34 based at least in part on the input. The external source may include one or more of radar, a second sensor module 12, a radio frequency direction finder, an acoustic locating system, and a user interface configured to receive target location data from a user.

In some embodiments, the optical data of the third region of interest 34 includes information indicative of a distance from the first optical sensor 20 to the first target of interest 26. Such data may be captured if the sensor 20 is a LIDAR sensor if by using physically spaced apart sensors 18 for example.

The system 10 is configured to determine a location of the first target of interest 26 in an earth fixed coordinate system in some embodiments. This may be a latitude, longitude, and altitude location of the first target of interest 26. As such, the controller 14 may transmit the absolute location of the target 26 to another system like a weapons system as opposed to the location of the target 26 relative to the system 10.

Each optical sensor 18 may be configured to capture optical data between the optical sensor 18 and a maximum distance 46 away from the optical sensor 18 as suggested in FIG. 4. Each optical sensor 18 may selectively capture optical data only between a first distance 48 away from the optical sensor 18 and a second distance 50 away from the optical sensor 18 wherein the first distance 48 and the second distance 50 are less than the maximum distance 46. For example, this may be performed using laser range gated imagery.

Each optical sensor 18 is configured to collect optical data with a maximum field of regard. The system 10 is configured to capture date from a plurality of fields of regard 30, 32, 40 to capture a large portion 29 or all of the sky 29 as suggested in FIG. 3. Capturing the optical data of the first region of interest 30 at the first refresh rate with the first optical sensor 20 includes capturing the optical data of the first region of interest 30 with less than the maximum field of regard of the first optical sensor 20. As such, the controller 14 can block data collection from one or more sensor 18 in a specific area 42 as suggested in FIGS. 3 and 4. For example, the system 10 may not capture data of an obstructed region 42. As shown in FIG. 3, a sensor 18 may capture data from a region of interest 40, but only captures data from region 44, while not capturing data of region 42.

The third region of interest 34 moves within the first region of interest 30, for example, in response to movement of the target of interest 26. As such, the optical sensors 18 track the target of interest 26. If the target of interest 26 moves into another region of interest, another optical sensor 18 will continue tracking the target of interest and will collect data in a region of interest around the target of interest 26 that is smaller than its maximum region of interest.

In some embodiments, the first region of interest 30 and the second region of interest 32 are the same size. In some embodiments, the first region of interest 30 overlaps at least a portion of the second region of interest 32. For example, region 40 overlaps region 32 as shown in FIG. 3. In some embodiments, the first region of interest 30 does not overlap with the second region of interest 32. For example, region 30 does not overlap region 32 in FIG. 3.

The first refresh rate and the second refresh rate are the same in illustrative embodiments. The controller 14 is configured to determine a size of the first target of interest 26 and select a size of the third region of interest 34 based on the size of the first target of interest 26. The controller 14 is further configured to determine a probability that the first target of interest 26 is an unmanned aerial system based on the optical data of the third region of interest 34.

According to another aspect of the present disclosure, the optical surveillance system 10 includes a sensor module 12 and a controller 14 as shown in FIG. 1. The sensor module 12 includes the base 16 and a plurality of optical sensors 18 coupled with the base 16. The optical sensors 18 are configured to capture optical data of the atmosphere. As shown in FIG. 1, the plurality of optical sensors 18 includes the first optical sensor 20 and the second optical sensor 22. The optical sensors 18 are configured to capture at least one of visible light, infrared light, and ultraviolet light.

The controller 14 is configured to perform any one or more of the method steps and functions described above. In the illustrative embodiment, the controller is configured to transmit instructions to the first optical sensor 20 to capture optical data of the first region of interest 30 at a first refresh rate and transmit instructions to the second optical sensor 22 to capture optical data of the second region of interest 32 at the second refresh rate.

The controller 14 can determine if a target of interest 26 is located in the first region of interest 30 based on the optical data of the first region of interest 30. The controller then transmits instructions to the first optical sensor 20 to capture optical data of the third region of interest 34 at the third refresh rate in response to determining that the target of interest 26 is located in the first region of interest 30.

In some embodiments, the plurality of optical sensors 18 are configured to capture optical data in at least a 2 Pi steradian field of regard as suggested in FIG. 3. In some embodiments, the plurality of optical sensors is configured to capture optical data in a 4 Pi steradian field of regard as suggested in FIG. 5.

The controller is further configured to determine the probabilistic identity of the first target of interest 26 based on the optical data of the third region of interest 34. In some embodiments, the sensor module 12 includes at least one light source 52 configured to illuminate the atmosphere as shown in FIG. 4. The light source 52 may include a laser, a laser diode, or other light source for illumination of the scene.

Each optical sensor 18 is configured to capture data indicative of a distance between the optical sensor 18 and the target of interest 26 based on light waves emitted from the at least one light source 52 and received by the optical sensor 18.

The optical surveillance system 10 may include a second sensor module 12 located at a distance relative to the first sensor module 12. The controller 14 may be configured to determine three-dimensional earth fixed coordinate location information about the target of interest 26 based on data received from the first sensor module 12 and the second sensor module 12.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An optical surveillance method comprising:
   capturing optical data of a first region of interest in the atmosphere at a first refresh rate with a first optical sensor,
   capturing optical data of a second region of interest in the atmosphere at a second refresh rate with a second optical sensor, the first sensor module and the second sensor module being coupled with a base,
   detecting a first target of interest in the first region of interest with a controller based on the optical data of the first region of interest,
   capturing optical data of a third region of interest in the atmosphere at a third refresh rate with the first optical sensor in response to detecting the first target of interest while simultaneously capturing the optical data of the second region of interest at the second refresh rate with the second optical sensor, the third region of interest being smaller than the first region of interest, the third region of interest being located inside the first region of interest, the third refresh rate being greater than the first refresh rate, and at least a portion of the first target of interest being located in the third region of interest,
   capturing optical data of a fourth region of interest in the atmosphere at a fourth refresh rate with the second optical sensor in response to the first target of interest moving toward a visual field of the second optical sensor, the fourth region of interest being smaller than the second region of interest, the fourth region of interest being located inside the second region of interest, and the fourth refresh rate being greater than the second refresh rate, and
   capturing additional optical data of the first region of interest in the atmosphere at the first refresh rate with the first optical sensor after the first target of interest enters the fourth region of interest while simultaneously capturing the optical data of the fourth region of interest at the fourth refresh rate with the second optical sensor,
   wherein the third region of interest, the third refresh rate, the fourth region of interest, and the fourth refresh rate are selected to optimize data bandwidth to allow the optical surveillance system to both monitor the first and second regions of interest for threats and track the first target of interest with a desired fidelity while conserving the data bandwidth.

2. The method of claim 1, wherein the first optical sensor is fixed to the base such that the first optical sensor is configured to capture optical data only in a fixed direction relative to the base and the second optical sensor is fixed to the base such that the second optical sensor is configured to capture data only in a fixed direction relative to the base and wherein the method further comprises determining a probabilistic identity of the first target of interest with the controller based on the optical data of the third region of interest by comparing variations between pixels of sequential frames included in the optical data of the third region of interest to predetermined data indicative of variations between pixels in sequential frames of known objects.

3. The method of claim 1, further comprising detecting a second target of interest located in the second region of interest with the controller based on the optical data of the second region of interest and capturing optical data of the fourth region of interest at the fourth refresh rate with the second optical sensor after detecting the second target of interest while simultaneously capturing the optical data of the third region of interest at the third refresh rate with the first optical sensor.

4. The method of claim 1, further comprising receiving input with the controller from an external source, determining a location of the third region of interest based at least in part on the input, and the external source includes at least one of radar, a second sensor module, a radio frequency direction finder, an acoustic locating system, and a user interface configured to receive target location data from a user.

5. The method of claim 1, wherein the optical data of the third region of interest includes information indicative of a distance from the first optical sensor to the first target of interest and the method further includes determining a distance from the first optical sensor to the first target of interest based on the information.

6. The method of claim 5, further comprising determining a location of the first target of interest in an earth fixed coordinate system.

7. The method of claim 1, wherein the first optical sensor is configured to capture optical data between the first optical sensor and a maximum distance away from the first optical sensor and the method includes using laser range gated imagery to capture optical data only between a first distance away from the first optical sensor and a second distance away from the first optical sensor and the first distance and the second distance are less than the maximum distance.

8. The method of claim 2, wherein determining the probabilistic identity of the first target of interest based on the optical data of the third region of interest includes determining a probability that the first target of interest is an unmanned aerial system.

9. The method of claim 5, wherein the first optical sensor is configured to collect optical data with a maximum field of regard and capturing the optical data of the first region of interest at the first refresh rate with the first optical sensor includes capturing the optical data of the first region of interest with less than the maximum field of regard of the first optical sensor so that the first region of interest does not include an obstructed region so that data collection of the obstructed region is blocked to reduce the data bandwidth, and the method includes receiving input with the controller to define the obstructed region.

10. The method of claim 8, further comprising moving the third region of interest within the first region of interest in response to movement of the first target of interest so that the first optical sensor tracks the first target of interest.

11. An optical surveillance system comprising:
a sensor module that includes a base and a plurality of optical sensors coupled with the base and configured to capture optical data of the atmosphere and the plurality of optical sensors includes a first optical sensor and a second optical sensor, and
a controller including computer-readable medium having stored therein a plurality of instructions that when executed cause the optical surveillance system to:
capture optical data of a first region of interest at a first refresh rate with the first optical sensor,
capture optical data of a second region of interest at a second refresh rate with the second optical sensor,
transmit the captured optical data from the first optical sensor and the second optical sensor to the controller at a data collection bandwidth,
determine if a target of interest is located in the first region of interest with the controller based on the optical data of the first region of interest, and
capture optical data of a third region of interest at a third refresh rate with the first optical sensor in response to determining that a target of interest is located in the first region of interest such that the first optical sensor transmits the optical data of the third region of interest and the second optical sensor transmits the optical data of the second region of interest simultaneously to the controller, wherein the third region of interest is located inside the first region of interest, the third region of interest is smaller than the first region of interest and the third refresh rate is greater than the first refresh rate to optimize data flow for the data collection bandwidth and conserve processing power of the controller while providing higher resolution data of the first target of interest, and at least a portion of the target of interest is located in the third region of interest.

12. The optical surveillance system of claim 11, wherein the first optical sensor is fixed to the base such that the first optical sensor is configured to capture optical data only in a fixed direction relative to the base and the second optical sensor is fixed to the base such that the second optical sensor is configured to capture data only in a fixed direction relative to the base,
wherein the plurality of optical sensors are configured to capture optical data in at least a 2 Pi steradian field of regard, and
wherein the controller is further configured to determine a probabilistic identity of the target of interest based on the optical data of the third region of interest.

13. The optical surveillance system of claim 11, wherein the sensor module includes at least one light source configured to illuminate the atmosphere.

14. The optical surveillance system of claim 11, wherein the controller is further configured to transmit instructions to the first optical sensor to periodically switch between capturing optical data of the third region of interest and capturing optical data of the first region of interest while at least a portion of the first target of interest is in the first region of interest and the third region of interest.

15. The optical surveillance system of claim 13, wherein the first optical sensor is configured to capture data indicative of a distance between the first optical sensor and the target of interest based on light waves emitted from the at least one light source and received by the first optical sensor.

16. An optical surveillance method comprising:
capturing optical data of a first region of interest at a first refresh rate with a first optical sensor,
capturing optical data of a second region of interest at a second refresh rate with a second optical sensor, the first optical sensor and the second optical sensor being coupled with a base,
detecting a first target of interest in the first region of interest with a controller based on the optical data of the first region of interest,
determining a probabilistic identity of the first target of interest with the controller based on the optical data of the first region of interest,
capturing optical data of a third region of interest at a third refresh rate with the first optical sensor in response to detecting the first target of interest while simultaneously capturing the optical data of the second region of interest at the second refresh rate with the second optical sensor, the third region of interest being located inside the first region of interest, the third region of interest being smaller than the first region of interest and the third refresh rate being greater than the first refresh rate to optimize and conserve data bandwidth while capturing higher resolution data of the first target of interest, and at least a portion of the first target of interest being located in the third region of interest, validating the probabilistic identity of the first target of interest with the controller based on the optical data of the third region of interest, and capturing additional optical data of the third region of interest at the third refresh rate with the first optical sensor in response to validating the first target of interest while simultaneously capturing the optical data of the second region of interest at the second refresh rate with the second optical sensor to conserve data bandwidth so that tracking of the first target of interest processing power in minimized.

17. The method of claim 16, further comprising receiving input with the controller to define an obstructed region and wherein the first optical sensor is configured to collect optical data with a maximum field of regard and capturing the optical data of the first region of interest at the first refresh rate with the first optical sensor includes capturing the optical data of the first region of interest with less than the maximum field of regard of the first optical sensor so that the first region of interest does not include the obstructed region to reduce the data bandwidth.

18. The method of claim 16, further comprising capturing optical data of a fourth region of interest at a fourth refresh rate with the second optical sensor in response to the first target of interest moving toward a visual field of the second optical sensor, the fourth region of interest being smaller than the second region of interest, the fourth region of interest being located inside the second region of interest, and the fourth refresh rate being greater than the second refresh rate, and capturing additional optical data of the first region of interest at the first refresh rate with the first optical sensor and the controller after the first target of interest enters the fourth region of interest while simultaneously capturing the optical data of the fourth region of interest at the fourth refresh rate with the second optical sensor and the controller.

19. The method of claim 16, further comprising periodically switching between capturing optical data of the third region of interest and capturing optical data of the first region of interest with the first optical sensor while the first target of interest is in the first region of interest and the third region of interest.

20. The method of claim 16, wherein determining the probabilistic identity of the first target of interest based on the optical data of the third region of interest includes determining a probability that the first target of interest is an unmanned aerial system by comparing variations between pixels of sequential frames included in the optical data of the third region of interest to predetermined data patterns indicative of variations between pixels in sequential frames of known unmanned aerial systems.

\* \* \* \* \*